United States Patent
Fang et al.

(10) Patent No.: US 12,212,792 B2
(45) Date of Patent: *Jan. 28, 2025

(54) SET-TOP BOX WITH SELF-MONITORING AND SYSTEM AND METHOD FOR USE OF SAME

(71) Applicant: Enseo, LLC, Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,090

(22) Filed: Nov. 28, 2023

(65) Prior Publication Data

US 2024/0098322 A1 Mar. 21, 2024

Related U.S. Application Data (63) Continuation of application No. 17/573,554, filed on Jan. 11, 2022, now Pat. No. 11,831,934, which is a continuation of application No. 17/061,621, filed on Oct. 2, 2020, now Pat. No. 11,223,823, which is a continuation of application No. 15/791,884, filed on Oct. 24, 2017, now Pat. No. 10,798,374.

(60) Provisional application No. 62/414,309, filed on Oct. 28, 2016.

(51) Int. Cl.
H04N 21/24 (2011.01)
H04N 21/262 (2011.01)
H04N 21/431 (2011.01)

(52) U.S. Cl.
CPC ..... *H04N 21/2405* (2013.01); *H04N 21/2402* (2013.01); *H04N 21/26216* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 3,781,703 | A | 12/1973 | Duty |
| 4,003,006 | A | 1/1977 | Mandeville et al. |
| 5,109,286 | A | 4/1992 | West, Jr. et al. |
| 5,390,348 | A | 2/1995 | Magin et al. |
| 6,351,631 | B1 | 2/2002 | Noeske et al. |
| 6,430,200 | B1 | 8/2002 | Han et al. |
| 6,587,012 | B1 | 7/2003 | Farmer et al. |
| 7,058,436 | B2 | 6/2006 | Kai et al. |

(Continued)

*Primary Examiner* — Omar S Parra
(74) *Attorney, Agent, or Firm* — Scott Griggs; Griggs Bergen LLP (57) ABSTRACT

A set-top box with self-monitoring and system and method for use of the same are disclosed. In one embodiment of the set-top box, a housing secures a television input, a television output, a processor, memory, and storage therein, which are communicatively interconnected by a busing architecture. The memory is accessible to the processor, and the memory includes processor-executable instructions that, when executed, cause the processor to detect when the television is not being utilized. Responsive thereto, the instructions cause the processor to scan channels received from the television input and generate a composite TV screen image data that may be resolved to a single TV screen image made from an assemblage of TV screen image captures corresponding to the scanned channels.

20 Claims, 6 Drawing Sheets

(56) References Cited

U.S. PATENT DOCUMENTS

| | | |
|---|---|---|
| 7,395,544 B2 | 7/2008 | Goldman |
| 7,693,491 B2 | 4/2010 | Pan |
| 7,792,183 B2 | 9/2010 | Massey et al. |
| 8,990,864 B2 | 3/2015 | Anandakumar et al. |
| 2002/0044610 A1 | 4/2002 | Jones |
| 2002/0160800 A1 | 10/2002 | Rozmaryn |
| 2002/0183033 A1 | 12/2002 | Gu et al. |
| 2005/0144640 A1 | 6/2005 | Fritsch et al. |
| 2005/0157804 A1 | 7/2005 | Jones |
| 2005/0160468 A1 | 7/2005 | Rodriguez et al. |
| 2005/0183130 A1 | 8/2005 | Sadja et al. |
| 2006/0107302 A1 | 5/2006 | Zdepski |
| 2006/0116082 A1 | 6/2006 | Pan |
| 2006/0146169 A1 | 7/2006 | Segman |
| 2006/0195857 A1 | 8/2006 | Wheeler et al. |
| 2006/0211368 A1 | 9/2006 | Wisnia |
| 2007/0118866 A1 | 5/2007 | Chen |
| 2008/0061842 A1 | 3/2008 | Paraschou et al. |
| 2008/0084956 A1 | 4/2008 | Paraschou et al. |
| 2008/0256421 A1 | 10/2008 | Gerstel et al. |
| 2009/0064252 A1 | 3/2009 | Howarter et al. |
| 2009/0185037 A1 | 7/2009 | Shi et al. |
| 2009/0265745 A1 | 10/2009 | Egan, Jr. et al. |
| 2010/0017842 A1 | 1/2010 | Wells |
| 2010/0037264 A1 | 2/2010 | Hardacker et al. |
| 2010/0095344 A1 | 4/2010 | Newby et al. |
| 2010/0100918 A1 | 4/2010 | Egan, Jr. et al. |
| 2010/0100921 A1 | 4/2010 | Olson et al. |
| 2010/0100922 A1 | 4/2010 | Olson et al. |
| 2010/0125877 A1 | 5/2010 | Wells et al. |
| 2010/0146564 A1 | 6/2010 | Halik et al. |
| 2010/0189042 A1 | 7/2010 | Pan |
| 2010/0244980 A1 | 9/2010 | Olson et al. |
| 2010/0251314 A1 | 9/2010 | Olson et al. |
| 2010/0251320 A1 | 9/2010 | Shafer et al. |
| 2010/0251321 A1 | 9/2010 | Palinkas et al. |
| 2010/0251322 A1 | 9/2010 | Palinkas et al. |
| 2010/0251323 A1 | 9/2010 | Jackson |
| 2010/0301972 A1 | 12/2010 | Alkan |
| 2010/0315942 A1 | 12/2010 | Jackson et al. |
| 2011/0072472 A1 | 3/2011 | Wells et al. |
| 2011/0085045 A1 | 4/2011 | Kelma |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2011/0181371 A1 | 7/2011 | Alkan et al. |
| 2011/0187481 A1 | 8/2011 | Alkan et al. |
| 2011/0199490 A1 | 8/2011 | Shafer et al. |
| 2011/0307913 A1 | 12/2011 | Wang et al. |
| 2012/0008910 A1 | 1/2012 | Tamura et al. |
| 2012/0105730 A1 | 5/2012 | Elizerov et al. |
| 2013/0031582 A1 | 1/2013 | Tinsman et al. |
| 2013/0139193 A1 | 5/2013 | Fan et al. |
| 2013/0145395 A1 | 6/2013 | Jeong et al. |
| 2013/0188095 A1 | 7/2013 | Hartson et al. |
| 2013/0332968 A1 | 12/2013 | Anandakumar et al. |
| 2014/0282705 A1 | 9/2014 | Chatterjee et al. |
| 2016/0227273 A1 | 8/2016 | Lee |
| 2017/0150220 A1 | 5/2017 | Greene |
| 2018/0124390 A1 | 5/2018 | Fang et al. |

SET-TOP BOX WITH SELF-MONITORING AND SYSTEM AND METHOD FOR USE OF SAME

PRIORITY STATEMENT & CROSS-REFERENCE TO RELATED APPLICATIONS

This application is a continuation of U.S. patent application Ser. No. 17/573,554 entitled "Set-Top Box with Self-Monitoring and System and Method for Use of Same" filed on Jan. 11, 2022 in the names of William C. Fang, et al., now U.S. Pat. No. 11,831,934 issued on Nov. 28, 2023; which is a continuation of U.S. patent application Ser. No. 17/061,621 entitled "Set-Top Box with Self-Monitoring and System and Method for Use of Same" filed on Oct. 2, 2020 in the names of William C. Fang, et al., now U.S. Pat. No. 11,223,823 issued on Jan. 11, 2022; which is a continuation of U.S. patent application Ser. No. 15/791,884 entitled "Set-Top Box with Self-Monitoring and System and Method for Use of Same" filed on Oct. 24, 2017 in the names of William C. Fang, et al., now U.S. Pat. No. 10,798,374 issued on Oct. 6, 2020; which claims priority from U.S. Patent Application No. 62/414,309, entitled "Set-Top Box with Self-Monitoring and System and Method for Use of Same" and filed on Oct. 28, 2016 in the names of Thomas R. Miller et al.; all of which are hereby incorporated by reference, in entirety, for all purposes.

TECHNICAL FIELD OF THE INVENTION

This invention relates, in general, to set-top boxes and, in particular, to set-top boxes with self-monitoring and systems and methods for use of the same that address and enhance coaxial cable television network service and delivery of an external signal source and provided to a television.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, a premium is placed on quality content and faultlessness are frequent differentiators in determining the experience of guests staying in hospitality lodging establishments. Accordingly, there is a need for improved systems and methods for providing enhanced content in an error free or near error free platform in the hospitality lodging industry.

SUMMARY OF THE INVENTION

It would be advantageous to achieve a set-top box that would improve upon existing limitations in functionality. It would also be desirable to enable a computer-based electronics and software solution that would provide enhanced content in an error free or near error free platform in the hospitality lodging industry or in another environment. To better address one or more of these concerns, a set-top box with self-monitoring and system and method for use of the same are disclosed. In one embodiment of the set-top box, a housing secures a television input, a television output, a processor, memory, and storage therein, which are communicatively interconnected by a busing architecture. The memory is accessible to the processor, and the memory includes processor-executable instructions that, when executed, cause the processor to detect when the television is not being utilized. Responsive thereto, the instructions cause the processor to scan channels received from the television input and generate a composite TV screen image data that may be resolved to a single TV screen image made from an assemblage of TV screen image captures corresponding to the scanned channels.

In another embodiment, the housing may include a housing-dongle combination securing the television input, the television output, the processor, memory, and storage, therewith. In this embodiment, the processor and the memory may be distributed through the housing-dongle combination. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
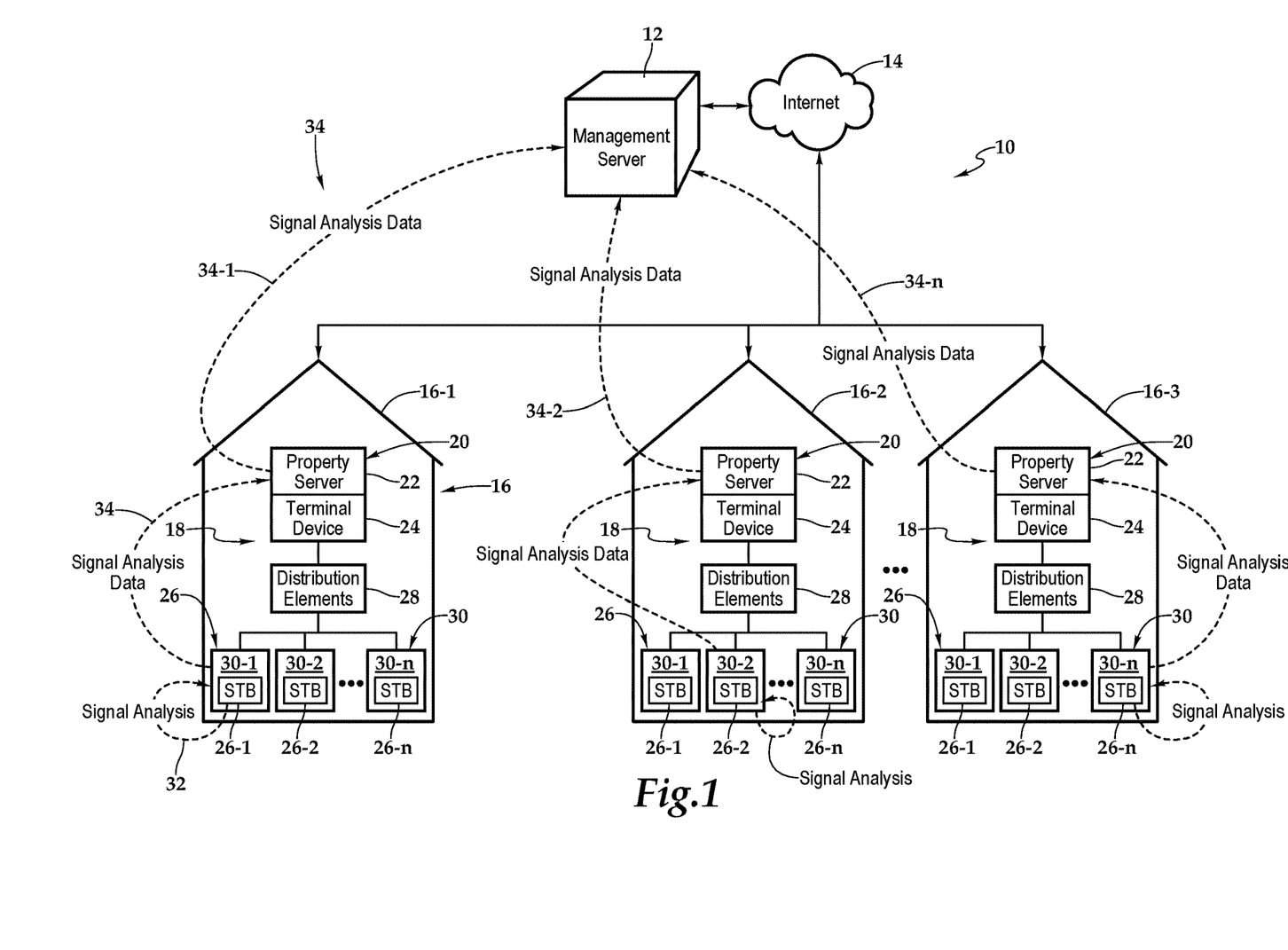
FIG. 1 is a schematic diagram depicting one embodiment of a system, which includes a set-top box having self-monitoring thereon according to the teachings presented herein.

Referring initially to FIG. 1, therein is depicted one embodiment of a system for providing self-monitoring networks, which is schematically illustrated and generally designated 10. A management server 12 utilizes the Internet 14 to communicate with multiple properties 16, which are individually labeled 16-1, 16-2, . . . 16-n. Each of the properties 16 may be a hospitality lodging establishment. The hospitality lodging establishment or, more generally, hospitality property, may be a multi-family residence, dormitory, lodging establishment, hotel, hospital, or other multi-unit environment, for example.

Each of the hospitality properties 16 includes an RF network 18 having a headend 20, which, as illustrated includes, in one embodiment, a property server 22 located in communication with a terminal device 24. The property server 22 and the terminal device 24 may be at least partially integrated. The property server 22 assists with the management of the particular properties 16. The terminal device 24 provides data services to set-top boxes 26 through distribution elements 28. The set-top boxes 26 subscribe to the data services, which may include various forms of media, content, and television programming, for example. As illustrated, each set-top box 26 is labeled 26-1, 26-2, . . . 26-n. In one implementation, each of the properties 16 may include multiple rooms, generally labeled 30 and individually labeled 30-1, 30-2, . . . , 30-n. Further, each of the set-top boxes 26 may be located in a room 30.

More specifically, the property headend 20, including the terminal device 24, may include point-to-multipoint transmission in a downstream direction and multipoint-to-point transmission in the upstream direction. Further, the terminal device 24 may be a Cable Modem Termination System (CMTS) or a video distribution modulation device, for example. The distribution elements 28 may include various splitters and amplifiers, for example. Further, the distribution elements 28 may provide bi-directional RF signal distribution capability between the set-top boxes 26 and the property headend 20.

As illustrated, the set-top boxes 26 perform signal analysis as shown by signal analysis 32. The signal analysis 32 may include an analysis of various analog and digital parameters. Following the signal analysis 32, signal analysis data 34, which includes signal analysis data 34-1, 34-2, . . . , 34-n, is then forwarded to the property headend 20 and onto the management server 12. The signal analysis data 34 may be utilized at the property headend 20 or the management server 12 to provide an indication of the health of the RF network 18. As shown, the signal analysis data 34 may be transmitted from the set-top boxes 26 to the headend 20 via the distribution elements 28 or wirelessly, for example.

Figure 2:
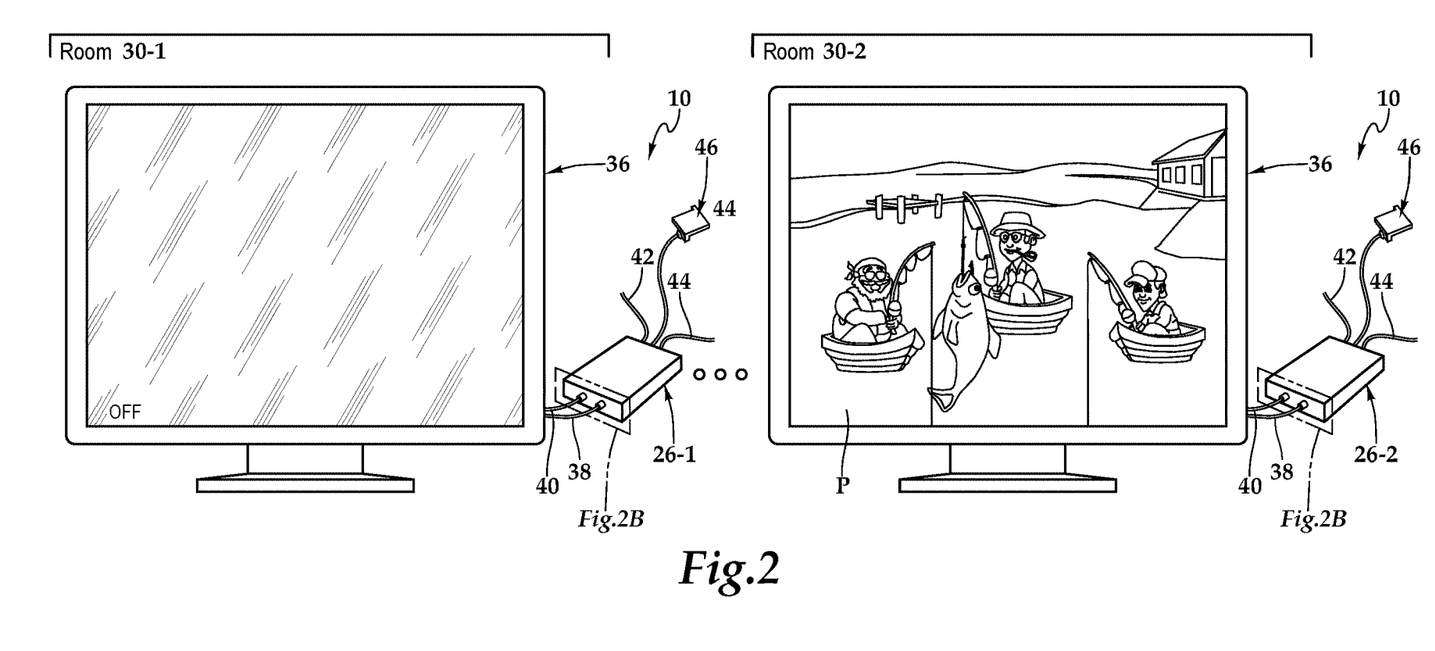
FIG. 2 is a schematic diagram depicting one embodiment of a room depicted in FIG. 1, wherein a set-top box having self-monitoring is being utilized.

Referring now to FIG. 2, as shown, by way of example and not by way of limitation, the hospitality environment is depicted as the property 16 having room 30-1 and room 30-2 respectively including the set-top box 26-1 and the set-top box 26-2. With respect to the room 30-1, the set-top box 26-1 is communicatively disposed with various amenities associated with the hospitality environment, including a display illustrated as a television 36.

A connection, which is depicted as an HDMI connection 38, connects the set-top box 26-1 to the television 14. Other connections include a power cable 40 coupling the set-top box 26-1 to a power source, a coaxial cable 42 coupling the set-top box 26-1 to an external cable source, and a category five (Cat 5) cable 44 coupling the set-top box 26-1 to external pay-per-view source at a hotel or other lodging establishment, for example. As shown, the set-top box 26-1 includes a dongle 46 providing particular technology and functionality extensions thereto. More generally, it should be appreciated that the cabling connected to the set-top box 26-1 will depend on the environment and application, and the cabling connections presented in FIG. 2 are depicted for illustrative purposes. Further, it should be appreciated that the positioning of the set-top box 26-1 will vary depending on environment and application and, with certain functionality, the set-top box 26-1 may be placed more discretely behind the television 36. With respect to the room 30-2, the set-top box 26-2 has very similar functionality to the set-top box 26-1 described in the room 30-1.

As the monitoring of a conventional tree topology RF network can be costly and complex, in the present instance, a set-top box collects data and performs analysis on the RF network and makes this data and analysis available to the headend and/or a management server, which may be remotely located. More particularly, in one implementation, the set-top boxes provide analysis of the CATV signal such as signal level, modulation errors and the network signal to noise ratio. Additionally, a full spectrum analysis may also be completed to provide visibility into any network system-level issues. As the set-top boxes are collecting the data and performing the analysis within a network, such as a hospitality environment, the monitoring capabilities exist at different points of the delivery path, reaching out to the last device on the network.

In one embodiment, the set-top boxes 26-1 26-2 collect data and perform the network analysis while the television is not in use. As shown in FIG. 2, the television 36 associated with the set-top box 26-1 in the room 30-1 is not in use as indicated by the label OFF. On the other hand, the television 36 associated with the set-top box 26-2 in the room 30-2 is in use as indicated by the label P, showing that a program is being viewed on the television 36 in the room 30-2. In the illustrated embodiment, the set-top box 26-1 performs the data collection and analysis as the television 36 of the room 30-1 is not in use, however, the set-top box 26-2 does not perform any data collection and analysis as the television 36 of the room 30-2 is in use.

Figure 3A:
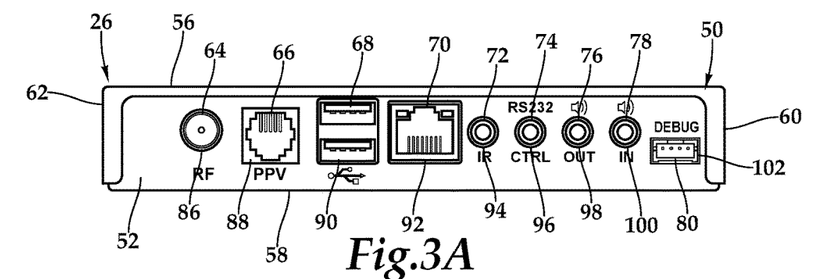
FIG. 3A is a wall-facing exterior elevation view of one embodiment of the set-top box depicted in FIG. 1 in further detail.
Figure 3B:
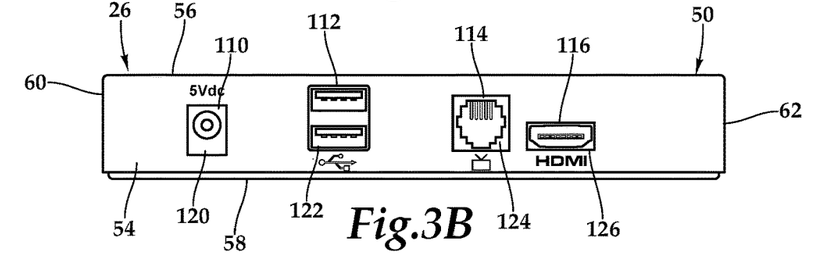
FIG. 3B is a television-facing exterior elevation view of one embodiment of the set-top box depicted in FIG. 2A.
Figure 3C:
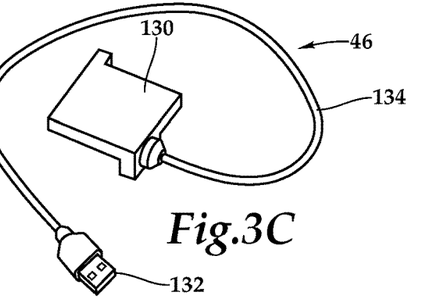
FIG. 3C is a front perspective view of one embodiment of a dongle depicted in FIG. 2A.

Referring to FIG. 3A, FIG. 3B, and FIG. 3C, as used herein, set-top boxes, back boxes and set-top/back boxes may be discussed as set-top boxes. By way of example, the set-top box 26 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide electro-mechanical connectors for various interfaces, including inputs and outputs. In one implementation, as illustrated, the ports 64 through 80 include inputs 82 and outputs 84 and, more particularly, an RF input 86, an RJ45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ45 coupling 124, and an HDMI port 126. It should be appreciated that the configuration of ports may vary with the set-top box depending on application and context. As previously alluded to, the housing 50 may include a housing-dongle combination including, with respect to the dongle 46, a unit 130 having a cable 134 with a set-top box connector 132 for selectively coupling with the set-top box 26.

Figure 4:
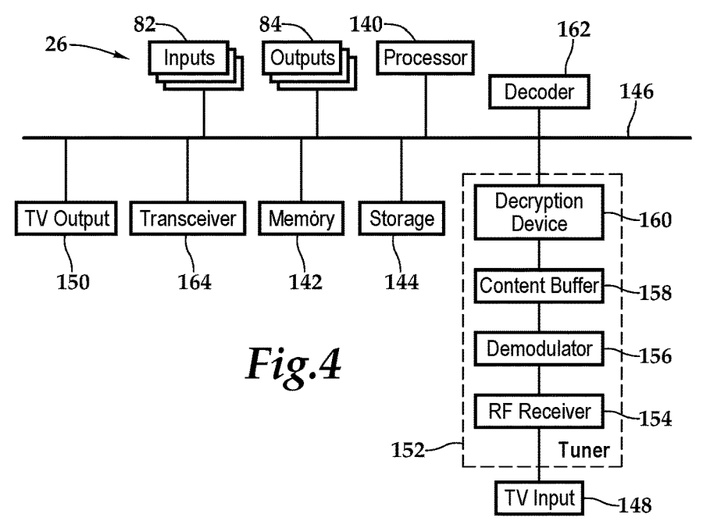
FIG. 4 is a functional block diagram depicting one embodiment of the set-top box presented in FIGS. 3A and 3B.

Within the housing 50, a processor 140, memory 142, storage 144, the inputs 82, and the outputs 84 are interconnected by a bus architecture 146 within a mounting architecture. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 26. The various inputs 82 and outputs 84 provide connections to and from the computing device, wherein the inputs 82 are the signals or data received by the set-top box 26, and the outputs 84 are the signals or data sent from the set-top box 26.

A television content signal input 148 and a television output 150 are also secured in the housing 50 in order to receive content from a source in the hospitality property and forward the content, including external content such as cable and satellite and pay-per-view (PPV) programming, to the television located within the hotel room. More specifically, the television input 148 receives a source signal from an external source. The source signal includes multiple channels and each of the multiple channels has periodic, sequential signal access points that permit tuning initiation. A tuner 152 is configured to receive and tune a channel from the source signal. As shown, the tuner 152 includes an RF receiver 154, a demodulator 156, and a content buffer 158 associated with a decryption device 160 and a decoder 162 in order to provide a tuned channel. The radio frequency (RF) receiver 154 is the portion of the tuner that receives RF transmissions and converts the selected carrier frequency and its associated bandwidth into a fixed frequency that is suitable for further processing. The demodulator 156 is an electronic circuit that is used to recover the information content from the modulated carrier wave provided by the RF receiver 154. The contact buffer 158 stores the signal and may be independent storage or associated with or form a portion of the memory 142 or the storage 144. In one embodiment, the content buffer 158 may be a first-in-first-out (FIFO) buffer, having one per tuner, in the memory. The content buffer may hold at least one access point for the incurring signal streams when the buffer is assigned to the correct viewing channel, the processor may quickly jump to the access point in the buffer and start the content decryption and decoding process. The decryption device 160 then decrypts the demodulated signal before decoding at the decoder 162. It should be appreciated that although a particular architecture of tuner, RF receiver, demodulator, decryption device and decoder is depicted, other architectures are within the teachings presented herein.

A transceiver 164 is associated with the set-top box 26 and communicatively disposed with the bus 146. As shown, the transceiver 164 may be internal, external, or a combination thereof to the housing. Further, the transceiver 164 may be a transmitter/receiver, receiver, or an antenna for example. Communication between various amenities in the hotel room and the set-top box 26 may be enabled by a variety of wireless methodologies employed by the transceiver 164, including 802.11, 3G, 4G, Edge, Wi-Fi, ZigBee, near field communications (NFC), Bluetooth low energy and Bluetooth, for example. Also, infrared (IR) may be utilized. Further, communication between the set-top box 26 and the property headend 20 and/or the management server 12 may be at least partially enabled by the transceiver 164.

The memory 142 and storage 144 are accessible to the processor 140 and include processor-executable instructions that, when executed, cause the processor 140 to execute a series of operations. The processor-executable instructions detect when the television associated with the set-top box is not being utilized and responsive to the television not being utilized, scan multiple channels received from the television input 148 provided by the property headend. The processor-executable instructions then cause the processor to generate TV screen image data for each of the channels. The TV screen image data may correspond to a TV screen image capture and the TV screen image data may include a date and time stamp and channel identification.

The processor-executable instructions also cause the processor to, responsive to the television not being utilized, analyze a parameter selected from the group consisting of analog signal levels, carrier level, carrier to noise ratio (CNR), signal to noise ratio (SNR), power line hum modulation, modulation error ratio (MER), bit error rate (BER), digital signal level, frequency of lost packets, jitter, transmit time, power level, and ranging status, for example. Then the processor generates composite TV screen image data, which is the composite TV screen image data resolved to a single TV screen image made from an assemblage of the TV screen image captures corresponding to the channels. The processor-executable instructions then cause the processor to send signal analysis data relative to the composite TV screen image data to the property headend and/or the management server.

Figure 5:
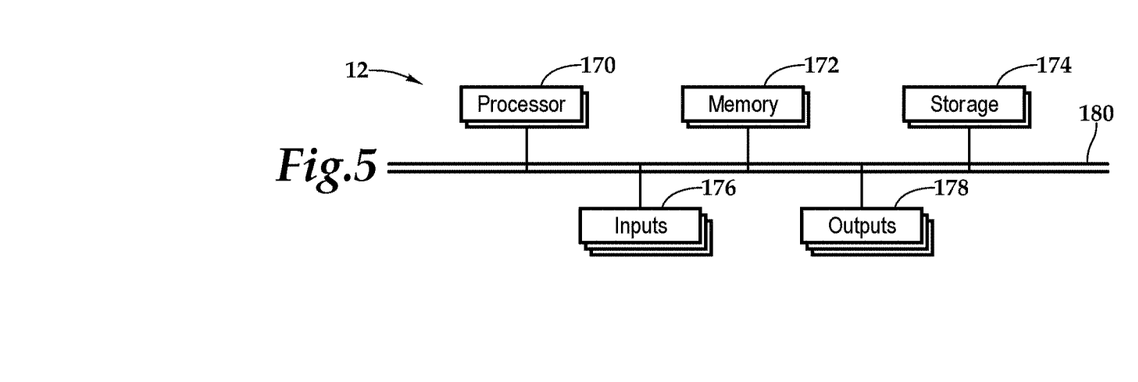
FIG. 5 is a functional block diagram depicting one embodiment of a management server presented in FIG. 1.

Referring to FIG. 5, the management server 12 includes a processor 170, memory 172, storage 174, inputs 176, and outputs 178 that are interconnected by a bus architecture 180 within a mounting architecture. More generally, with respect to the management server 12, a common or distributed, for example, mounting architecture may be employed. In other implementations, in the management server 12, multiple processors and/or multiple buses may be used, as appropriate, along with multiple memories and types of memory. Further still, in other implementations, multiple computing devices may be provided and operations distributed therebetween.

The processor 170 may process instructions for execution within the computing device, including instructions stored in the memory 172 or in the storage 174. The memory 172 stores information within the computing device. In one implementation, the memory 172 is a volatile memory unit or units. In another implementation, the memory 172 is a non-volatile memory unit or units. The storage 174 provides capacity that is capable of providing mass storage for the management server 12. Various inputs 176 and outputs 178 provide connections to and from the management server 12, wherein the inputs 176 are the signals or data received by the management server 12, and the outputs 178 are the signals or data sent from the management server 12. In one implementation, the inputs 176 and the outputs 178 provide the connectivity to the Internet 14 and, therefore, the communication with the properties 16.

Figure 7:
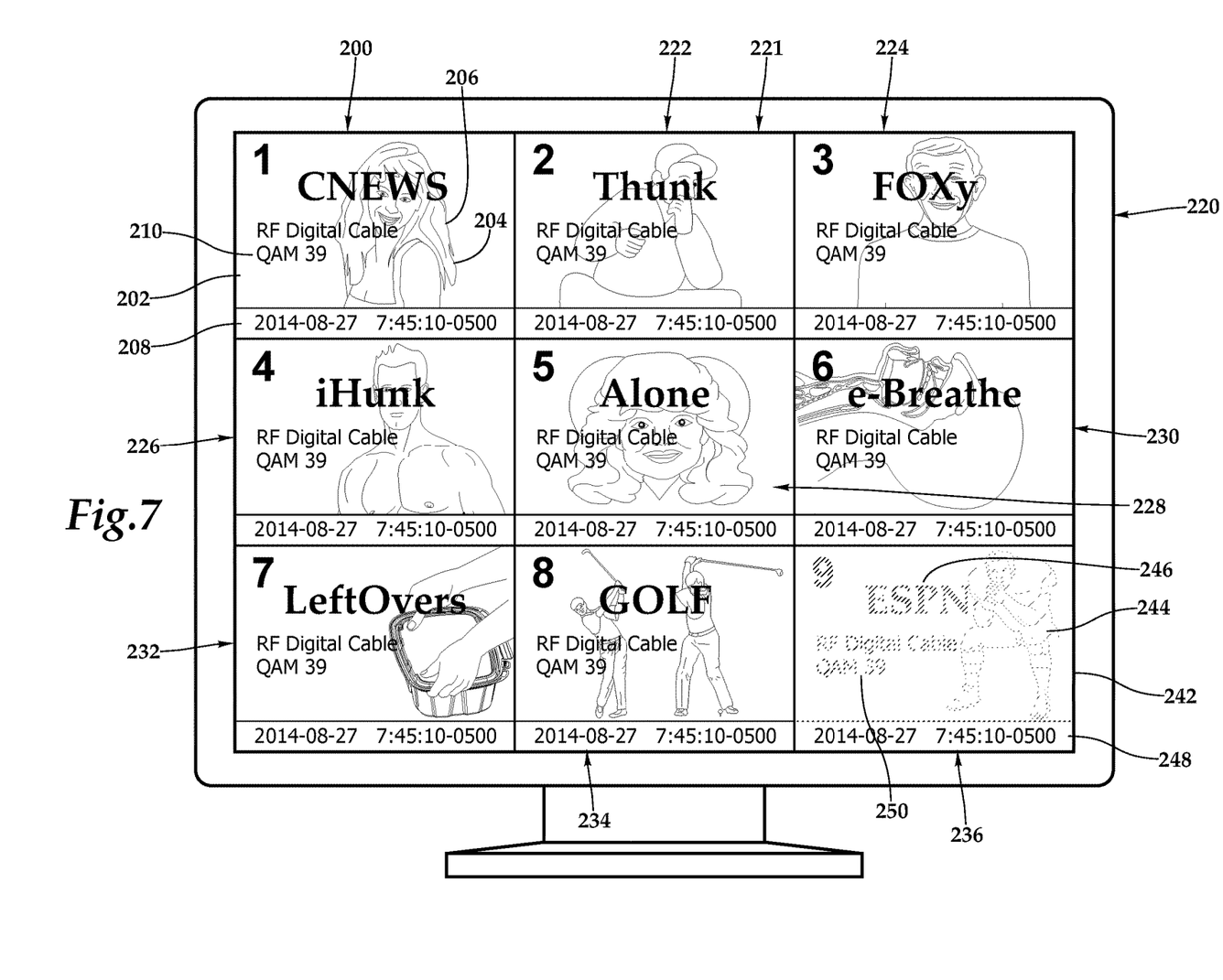
FIG. 7 is a schematic block diagram depicting one embodiment of resolved composite TV screen image data generated by the set-top box depicted in FIG. 1.
Figure 8:
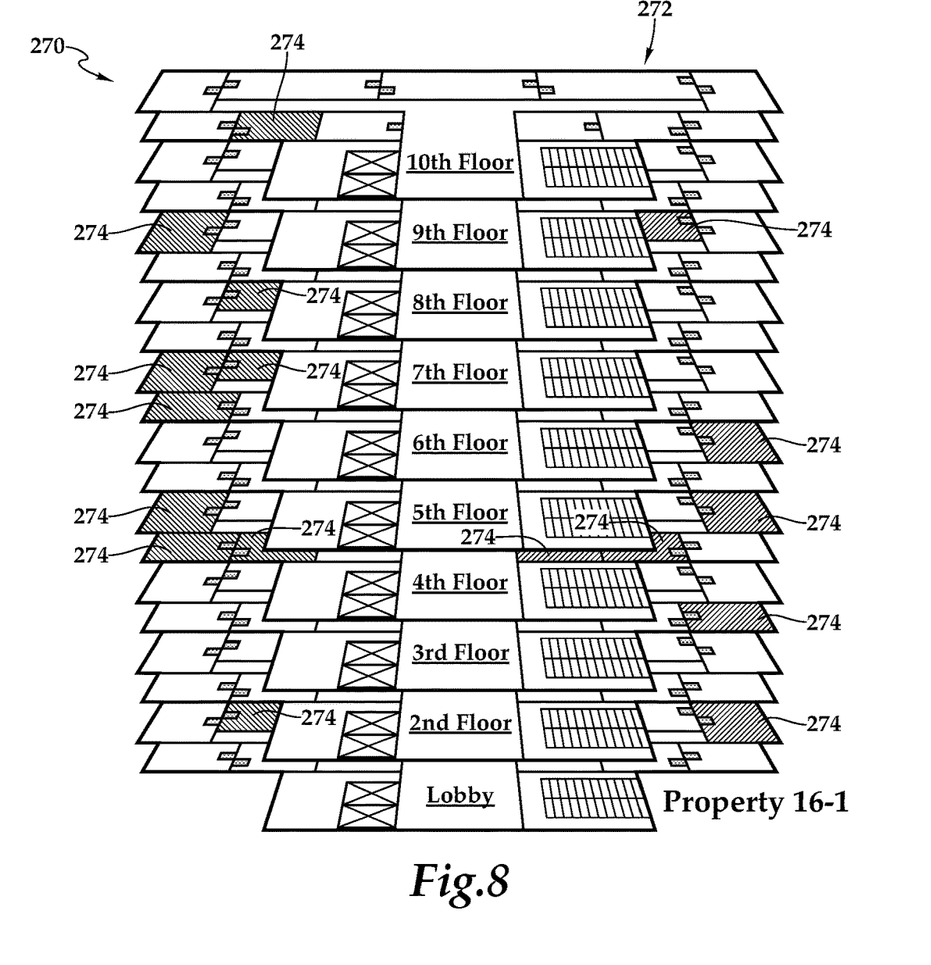
FIG. 8 is a schematic block diagram depicting one embodiment of a graphical representation of a property under analysis utilizing a self-monitoring and system according to the teachings presented herein.

The memory 172 and storage 174 are accessible to the processor 170 and include processor-executable instructions that, when executed, cause the processor 170 to execute a series of operations. The processor-executable instructions receive at the inputs 176 the signal analysis data 34 from the properties 16 and thereafter, analyze the signal analysis data 34. The processor-executable instructions may then generate a single TV screen image, as shown in FIG. 7, made from an assemblage of the TV screen image captures corresponding to the channels. This presentation furnishes RF network health status in substantially real time to permit a user or manager to select the desired information and make optimal RF network health plans on a channel-by-channel basis within a hotel room. Additionally, the processor-executable instructions may cause the processor to provide property monitoring and optimization in the form of a database, or as shown in FIG. 8, in a graphical presentation wherein particular hotel rooms with RF network health status in substantially real time permits a user or manager to select the desired information and make optimal RF network health plans on a hotel basis.

Figure 6:
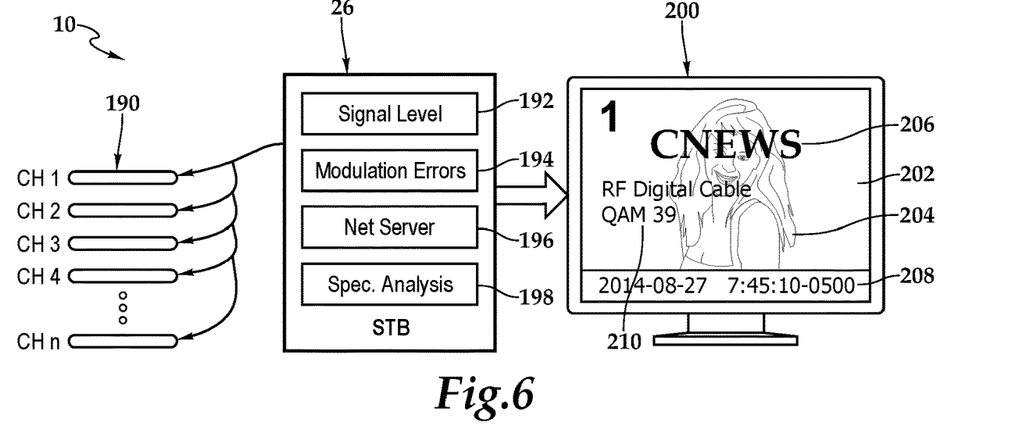
FIG. 6 is a schematic block diagram depicting one operational embodiment of the set-top box presented in FIG. 1.

Referring now to FIG. 6, as previously discussed, the set-top box 26 collects data and analyzes channels 190 when, in one implementation, the television is not being utilized by a viewer. As shown, in one embodiment, the set-top box 26 may sequentially collect data and analyze each of the channels with respect to signal level 192, modulation errors 194, network server performance 196, or spectrum analysis 198, for example. As shown, the set-top box is analyzing CH 1 of the channels 190 with respect to the signal level 192, modulation errors 194, network server performance 196, and spectrum analysis 198. Based on the data collection and analysis, the set-top box creates TV screen image data 200 for the CH 1 of the channels 190. In one embodiment, the TV screen image data 200 includes a TV screen image capture 202, which is a captured view of the TV screen image content 204 on the CH 1 of the channels 190. Additionally, channel identification information 206 is provided on the screen as is a date and time stamp 208. Signal analysis information 210 may also be provided, which may be a signal level stability measurement, a modulation error measurement, a visual indication of network server performance, a visual indication of spectrum performance, or other indication of an analog or digital parameter.

More specifically, by way example and not by way of limitation, the data collection and analysis performed may include analog parameters and digital parameters. The set-top box 26 may measure analog parameters including analog signal levels, carrier level, carrier to noise ratio (CNR), signal to noise ratio (SNR), and power line hum modulation. The set-top box 26 may also measure digital parameters, including modulation error ratio (MER), bit error rate (BER), digital signal level, frequency of lost packets, and jitter. Other parameters measured may include transmit time and associated timing adjustments that address the amount that the terminal device 24 and the set-top box 26 must change transmit time in order for bursts to arrive at the appropriate time. Power level relating to the time length value (TLV) of cable modem signals may be monitored too as well as ranging status addressing the maintenance of cable modem signals.

FIG. 7 depicts one embodiment of composite TV screen image data 220, which as shown may be resolved to a single TV screen image 221 made from an assemblage of TV screen image captures 202, 222, 224, 226, 228, 230, 232, 234, and 236 which respectively correspond to channels 1, 2, 3, 4, 5, 6, 7, 8, and 9. As shown, the TV screen image data 200 includes a TV screen image capture 202, which is a captured view of the TV screen image content 204 on the CH 1 of the channels 190. Additionally, channel identification information 206 is provided on the screen as is a date and time stamp 208. Signal analysis information 210 is also provided. Also, as shown, the TV screen image data 236 includes a TV screen image capture 242, which is a captured view of the TV screen image content 244 on the CH 9 of the channels 190.

Additionally, channel identification information 246 is provided on the screen as is a date and time stamp 248. Signal analysis information 250 may also be provided, which may be a signal level stability measurement, a modulation error measurement, a visual indication of network server performance, a visual indication of spectrum performance, or other indication of an analog or digital parameter. It should be appreciated that the TV screen image data 222, 224, 226, 228, 230, 232, 234 for respective channels 2, 3, 4, 5, 6, and 8 may be similar to the TV screen image data 200 of channel 1 and TV screen image data 236 of channel 9.

It should be appreciated that although the composite TV screen image data 220 is depicted as presenting nine channels, any number of channels may be presented within the single TV screen image. The exact number and layout of channels within the single TV screen image will depend on multiple factors, including the size of the monitor resolving the composite TV screen image data, the amount of data and analysis shown, and the number of channels needed to be presented. By capturing and presenting an assemblage of the client screen images for various channels, an operator is provided visual confirmation of service at any location including the property headend, the management server or other location. By way of example, with respect to TV screen image data 236 for channel 9, the operator can access the TV screen image capture 242, which is the captured view of the TV screen image content 244 that indicates distorted content and a problem requiring resolution.

Referring now to FIG. 8, in one implementation, property self-monitoring is provided in the form of a database, or as shown, in a graphical presentation 270 wherein particular hotel rooms with RF network status in substantially real time permits a user or manager to select the desired information and make optimal operations and maintenance plans. In particular, color-coding and hue assignment adds additional understanding and visibility into housekeeping and maintenance conditions as well as use. By way of example and not by way of limitation, the hotel, which forms part of property 16-1, is graphically depicted 272 as having a lobby and ten floors, which are lobby, $1^{st}$ floor, $2^{nd}$ floor, etc. By collecting the substantially real time RF operations and maintenance information from the field, i.e., from the set-top boxes 26 in each room, a map may be shown depicting all rooms with an outstanding operations and maintenance needs 274, for example. In particular, various rooms are highlighted due to operations and maintenance issues detected on the RF network by the respective set-top boxes 26. With this information and knowledge of the issue, maintenance may appropriately prioritize the requests, handle the requests in an optimal order, and bring all needed equipment, or even handle the necessary actions remotely. In this instance, the operator may click on a room to bring up the composite TV screen image data 220 to determine that the problem with the RF network is with channel 9 as shown in FIG. 7. As mentioned, it should be appreciated that other types of databases and charts may be prepared from the substantially real time information collected.

Figure 9:
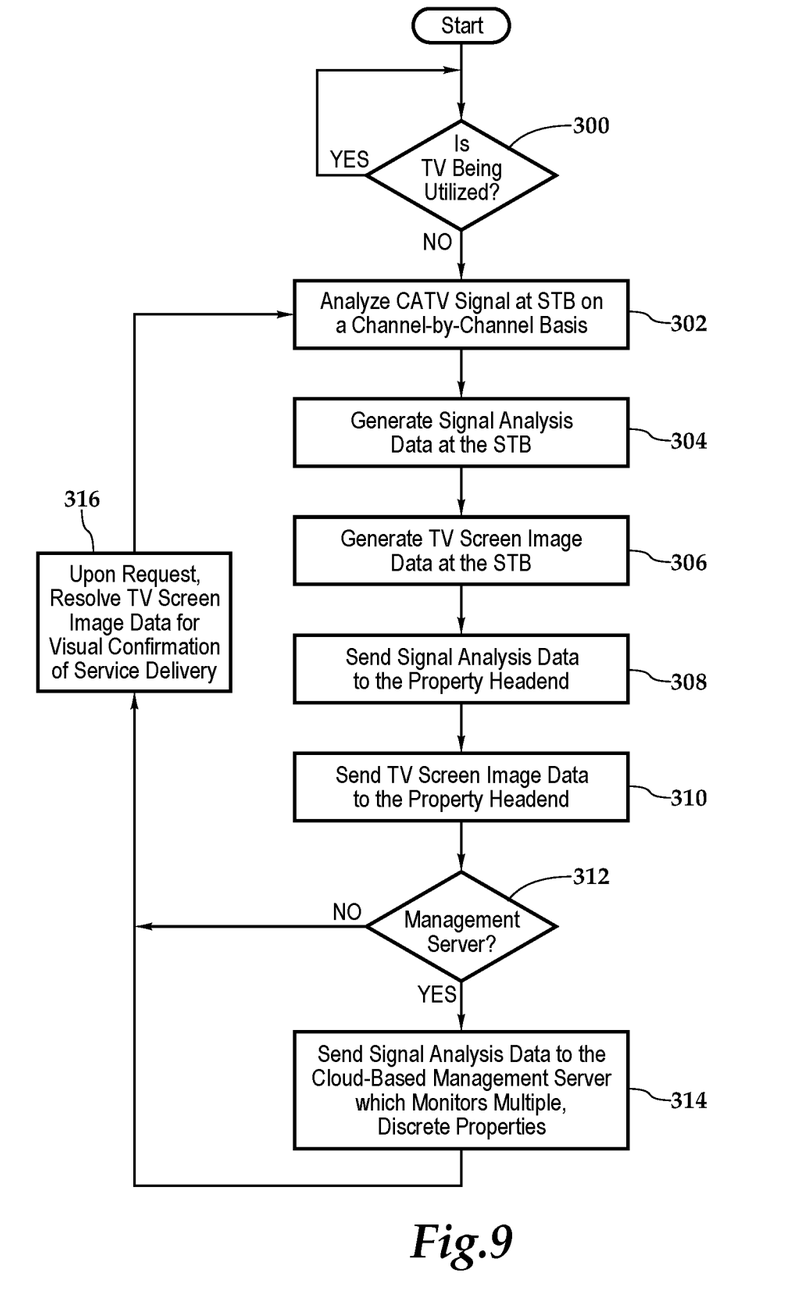
FIG. 9 is a flow chart depicting one embodiment of a method for providing a set-top box having self-monitoring according to the teachings presented herein.

FIG. 9 depicts one embodiment of a method for utilizing set-top boxes to self-monitor an RF network. At decision block 300, if the television in a particular room is not being utilized by a viewer or guest, then the methodology advances to block 302. If not, the method waits to advance. At block 302, responsive to the television not being utilized, the set-top box analyzes the CATV signal at the set-top box on a channel-by-channel basis. At block 304, data is collected by the set-top box and signal analysis data is generated. At block 306, the set-top box generates TV screen image data and then forwards the TV screen image data to the property headend at block 308. At decision block 310, if a management server is present then the methodology advances to block 312, where the signal analysis data may be sent to a cloud-based management server, which monitors, multiple, discrete properties. Returning to decision block 310, if no management server is present and, alternatively, following block 312, at block 316 upon request, the TV screen image data may be resolved by a user on any type of device to provide visual confirmation of service delivery and RF network performance.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for self-monitoring of a television, comprising:
    communicating with a television via a programming interface, wherein the television comprises a signal input, a processor, memory, and storage, and includes a busing architecture for communicative interconnection between the signal input, the processor, the memory, and the storage;
    detecting, by the processor, when the television is not being utilized;
    automatically scanning, by the processor and without user input while the television is not being utilized, a plurality of channels as received at the signal input from a remote external source over a network, in response to the detection that the television is not being utilized;
    automatically generating, by the processor and without user input while the television is not being utilized, TV screen image data for each of the plurality of channels as received from the remote external source, wherein the TV screen image data corresponds to a TV screen image capture, in response to the detection that the television is not being utilized; and
    automatically generating, by the processor and without user input while the television is not being utilized, composite TV screen image data, wherein the composite TV screen image data is resolved to a single TV screen image made from an assemblage of the TV screen image captures corresponding to the plurality of channels, in response to the detection that the television is not being utilized.

2. The method as recited in claim 1, wherein the generated TV screen image data further comprises a date and time stamp.

3. The method as recited in claim 1, wherein the generated TV screen image data further includes channel identification.

4. The method as recited in claim 1, further comprising measuring signal level stability for each of the plurality of channels by the processor.

5. The method as recited in claim 4, wherein the TV screen image data further comprises a signal level stability measurement for each of the plurality of channels.

6. The method as recited in claim 1, further comprising measuring modulation errors for each of the plurality of channels by the processor.

7. The method as recited in claim 6, wherein the TV screen image data further includes a modulation error measurement for each of the plurality of channels.

8. The method as recited in claim 1, further comprising analyzing network server performance for each of the plurality of channels by the processor.

9. The method as recited in claim 8, wherein the TV screen image data further comprises a visual indication of network server performance for each of the plurality of channels.

10. The method as recited in claim 1, further comprising performing a spectrum analysis for each of the plurality of channels by the processor.

11. The method as recited in claim 10, wherein the TV screen image data further comprises a visual indication of spectrum performance for each of the plurality of channels.

12. The method as recited in claim 1, further comprising sending signal analysis data relative to the composite TV screen image data to a server by the processor.

13. The method as recited in claim 12, wherein the server further comprises a property headend.

14. The method as recited in claim 12, wherein the server is a cloud-based server.

15. The method as recited in claim 12, wherein the server forms a component of an RF network having a property headend.

16. A method for self-monitoring of a television, comprising:
    communicating with a television via a programming interface, wherein the television includes a signal input, a processor, memory, and storage, and includes a busing architecture for communicative interconnection between the signal input, the processor, the memory, and the storage;
    detecting, by the processor, when the television is not being utilized;
    automatically scanning, by the processor and without user input while the television is not being utilized, a plurality of channels as received at the signal input from a remote external source over a network, in response to the detection that the television is not being utilized;
    automatically generating, by the processor and without user input while the television is not being utilized, TV screen image data for each of the plurality of channels as received from the remote external source, wherein the TV screen image data corresponds to a TV screen image capture and includes a date and time stamp and channel identification, in response to the detection that the television is not being utilized; and automatically generating, by the processor and without user input while the television is not being utilized, composite TV screen image data, wherein the composite TV screen image data is resolved to a single TV screen image made from an assemblage of the TV screen image captures corresponding to the plurality of channels, in response to the detection that the television is not being utilized.

17. The method as recited in claim 16, further comprising sending signal analysis data relative to the composite TV screen image data to a server by the processor.

18. The method as recited in claim 16, wherein the server further comprises a property headend.

19. The method as recited in claim 16, wherein the server forms a component of an RF network having a property headend.

20. A method for self-monitoring of a television, comprising:

communicating with a television via a programming interface, wherein the television includes a signal input from a set-top box, a processor, memory, and storage, and includes a busing architecture for communicative interconnection between the signal input, the processor, the memory, and the storage;

detecting, by the processor, when the television is not being utilized;

automatically scanning, by the processor and without user input while the television is not being utilized, a plurality of channels as received at the signal input from a remote external source over a network, in response to the detection that the television is not being utilized;

automatically generating, by the processor and without user input while the television is not being utilized, TV screen image data for each of the plurality of channels as received from the remote external source, wherein the TV screen image data corresponds to a TV screen image capture, in response to the detection that the television is not being utilized; and automatically generating, by the processor and without user input while the television is not being utilized, composite TV screen image data, wherein the composite TV screen image data is resolved to a single TV screen image made from an assemblage of the TV screen image captures corresponding to the plurality of channels, in response to the detection that the television is not being utilized.

* * * * *